United States Patent
Banerjee et al.

(10) Patent No.: US 10,581,802 B2
(45) Date of Patent: Mar. 3, 2020

(54) METHODS, SYSTEMS, AND COMPUTER READABLE MEDIA FOR ADVERTISING NETWORK SECURITY CAPABILITIES

(71) Applicant: Keysight Technologies Singapore (Sales) Pte. Ltd., Singapore (SG)

(72) Inventors: Joydeep Banerjee, Kolkata (IN); Joy Chakraborty, Bangalore (IN)

(73) Assignee: Keysight Technologies Singapore (Sales) Pte. Ltd., Singapore (SG)

(*) Notice: Subject to any disclaimer, the term of this patent is extended or adjusted under 35 U.S.C. 154(b) by 93 days.

(21) Appl. No.: 15/585,116

(22) Filed: May 2, 2017

(65) Prior Publication Data
US 2018/0270199 A1    Sep. 20, 2018

(30) Foreign Application Priority Data
Mar. 16, 2017    (IN) .............................. 201741009059

(51) Int. Cl.
  *H04L 29/06*    (2006.01)
  *H04L 29/08*    (2006.01)
  *H04L 12/751*   (2013.01)

(52) U.S. Cl.
  CPC .......... *H04L 63/0245* (2013.01); *H04L 45/02* (2013.01); *H04L 63/1433* (2013.01); *H04L 67/1012* (2013.01); *H04L 63/20* (2013.01)

(58) Field of Classification Search
  CPC ................................................. H04L 63/1433
  See application file for complete search history.

(56) References Cited

U.S. PATENT DOCUMENTS

| | | | |
|---|---|---|---|
| 6,088,804 A | 7/2000 | Hill et al. | |
| 6,711,127 B1 | 3/2004 | Gorman et al. | |
| 6,918,038 B1 | 7/2005 | Smith et al. | |
| 6,952,779 B1 | 10/2005 | Cohen et al. | |
| 7,013,395 B1 | 3/2006 | Swiler et al. | |
| 7,159,237 B2 | 1/2007 | Schneier et al. | |
| 7,296,092 B2 | 11/2007 | Nguyen | |
| 7,627,891 B2 | 12/2009 | Williams et al. | |
| 7,757,293 B2 | 7/2010 | Caceres et al. | |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

RFC 5575 (Marques et al., IETF, Aug. 2009) (Year: 2009).*

(Continued)

*Primary Examiner* — Nicholas P Celani (57) ABSTRACT

Methods, systems, and computer readable media for advertising network security capabilities are disclosed. According to one method, the method occurs at a network node. The method includes receiving a first route advertisement message that includes network security capabilities information indicating capabilities of a network security system associated with a route. The method also includes receiving a packet associated with a packet flow. The method further includes directing the packet associated with the packet flow to a downstream network node associated with the network security system.

13 Claims, 5 Drawing Sheets

(56) References Cited

U.S. PATENT DOCUMENTS

| | | |
|---|---|---|
| 7,784,099 B2 | 8/2010 | Benjamin |
| 7,926,113 B1 | 4/2011 | Gula et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,230,497 B2 | 7/2012 | Norman et al. |
| 8,256,002 B2 | 8/2012 | Chandrashekhar et al. |
| 8,321,936 B1 | 11/2012 | Green et al. |
| 8,356,353 B2 | 1/2013 | Futoransky et al. |
| 8,365,289 B2 | 1/2013 | Russ et al. |
| 8,413,237 B2 | 4/2013 | O'Rourke et al. |
| 8,490,193 B2 | 7/2013 | Sarraute Yamada et al. |
| 8,650,651 B2 | 2/2014 | Podjarny et al. |
| 8,712,596 B2 | 4/2014 | Scott |
| 8,732,839 B2 | 5/2014 | Hohl |
| 8,737,980 B2 | 5/2014 | Doshi et al. |
| 8,752,183 B1 | 6/2014 | Heiderich et al. |
| 8,813,235 B2 | 8/2014 | Sidagni |
| 8,955,118 B2 | 2/2015 | Franklin |
| 9,015,847 B1 | 4/2015 | Kaplan et al. |
| 9,043,922 B1 | 5/2015 | Dumitras et al. |
| 9,060,239 B1 | 6/2015 | Sinha et al. |
| 9,076,013 B1 | 7/2015 | Bailey, Jr. et al. |
| 9,177,139 B2 | 11/2015 | Hull Roskos |
| 9,183,397 B2 | 11/2015 | Futoransky et al. |
| 9,208,323 B1 | 12/2015 | Karta et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,367,694 B2 | 6/2016 | Eck et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,760,716 B1 | 9/2017 | Mulchandani |
| 9,774,618 B2 | 9/2017 | Sundhar et al. |
| 9,800,603 B1 | 10/2017 | Sidagni |
| 10,038,711 B1 | 7/2018 | Gorodissky et al. |
| 10,068,095 B1 | 9/2018 | Segal et al. |
| 10,122,750 B2 | 11/2018 | Gorodissky et al. |
| 10,162,970 B2 | 12/2018 | Olson et al. |
| 10,225,276 B2 | 3/2019 | Bort et al. |
| 10,257,220 B2 | 4/2019 | Gorodissky et al. |
| 10,367,846 B2 | 7/2019 | Gorodissky et al. |
| 10,382,473 B1 | 8/2019 | Ashkenazy et al. |
| 10,395,040 B2 | 8/2019 | Carey et al. |
| 10,412,112 B2 | 9/2019 | Ashkenazy et al. |
| 2003/0195861 A1 | 10/2003 | McClure et al. |
| 2003/0217039 A1 | 11/2003 | Kurtz et al. |
| 2004/0006704 A1 | 1/2004 | Dahlstrom et al. |
| 2004/0015728 A1 | 1/2004 | Cole et al. |
| 2004/0078384 A1 | 4/2004 | Keir et al. |
| 2004/0193918 A1 | 9/2004 | Green et al. |
| 2005/0028013 A1* | 2/2005 | Cantrell .............. H04L 43/00 726/4 |
| 2005/0086502 A1 | 4/2005 | Rayes et al. |
| 2005/0102534 A1 | 5/2005 | Wong |
| 2006/0190228 A1 | 8/2006 | Johnson |
| 2007/0011319 A1 | 1/2007 | McClure et al. |
| 2007/0019769 A1 | 1/2007 | Green et al. |
| 2007/0204347 A1 | 8/2007 | Caceres et al. |
| 2008/0092237 A1 | 4/2008 | Yoon et al. |
| 2008/0104702 A1 | 5/2008 | Choi et al. |
| 2008/0172479 A1 | 7/2008 | Majanen et al. |
| 2008/0172716 A1 | 7/2008 | Talpade et al. |
| 2008/0209567 A1 | 8/2008 | Lockhart et al. |
| 2008/0256638 A1 | 10/2008 | Russ et al. |
| 2008/0288822 A1 | 11/2008 | Wu et al. |
| 2009/0044277 A1 | 2/2009 | Aaron |
| 2009/0049553 A1 | 2/2009 | Vasudeva |
| 2009/0077666 A1 | 3/2009 | Chen et al. |
| 2009/0106843 A1 | 4/2009 | Kang et al. |
| 2009/0126015 A1 | 5/2009 | Monastyrsky et al. |
| 2009/0172813 A1 | 7/2009 | Aaron |
| 2009/0271867 A1 | 10/2009 | Zhang |
| 2009/0320137 A1 | 12/2009 | White et al. |
| 2010/0138925 A1 | 6/2010 | Barai et al. |
| 2011/0035803 A1 | 2/2011 | Lucangeli Obes et al. |
| 2011/0119765 A1 | 5/2011 | Hering et al. |
| 2011/0124295 A1 | 5/2011 | Mahjoubi Amine et al. |
| 2011/0185432 A1 | 7/2011 | Sandoval et al. |
| 2011/0263215 A1 | 10/2011 | Asplund et al. |
| 2012/0023572 A1 | 1/2012 | Williams, Jr. et al. |
| 2012/0096549 A1 | 4/2012 | Amini et al. |
| 2012/0144494 A1 | 6/2012 | Cole et al. |
| 2012/0174228 A1 | 7/2012 | Giakouminakis et al. |
| 2012/0185944 A1 | 7/2012 | Abdine et al. |
| 2012/0255022 A1 | 10/2012 | Ocepek et al. |
| 2013/0014263 A1 | 1/2013 | Porcello et al. |
| 2013/0031635 A1 | 1/2013 | Lotem et al. |
| 2013/0091539 A1 | 4/2013 | Khurana et al. |
| 2013/0097706 A1 | 4/2013 | Titonis et al. |
| 2013/0227697 A1 | 8/2013 | Zandani |
| 2013/0312081 A1 | 11/2013 | Shim et al. |
| 2013/0347060 A1 | 12/2013 | Hazzani |
| 2014/0007241 A1 | 1/2014 | Gula et al. |
| 2014/0092771 A1 | 4/2014 | Siomina et al. |
| 2014/0137257 A1 | 5/2014 | Martinez et al. |
| 2014/0173739 A1 | 6/2014 | Ahuja et al. |
| 2014/0237606 A1 | 8/2014 | Futoransky et al. |
| 2014/0245443 A1 | 8/2014 | Chakraborty |
| 2014/0259095 A1 | 9/2014 | Bryant |
| 2014/0341052 A1 | 11/2014 | Devarasetty et al. |
| 2014/0380485 A1 | 12/2014 | Ayyagari et al. |
| 2015/0058993 A1 | 2/2015 | Choi et al. |
| 2015/0096026 A1 | 4/2015 | Kolacinski et al. |
| 2015/0143524 A1 | 5/2015 | Chestna |
| 2015/0205966 A1 | 7/2015 | Chowdhury |
| 2015/0207811 A1 | 7/2015 | Feher et al. |
| 2016/0014625 A1 | 1/2016 | Devarasetty |
| 2016/0021056 A1 | 1/2016 | Chesla |
| 2016/0044057 A1 | 2/2016 | Chenette et al. |
| 2016/0080408 A1 | 3/2016 | Coleman et al. |
| 2016/0234188 A1* | 8/2016 | Guan .............. H04L 45/42 |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0195357 A1 | 7/2017 | Sundhar et al. |
| 2017/0279843 A1 | 9/2017 | Schultz et al. |
| 2017/0373923 A1 | 12/2017 | Kazachkov et al. |
| 2018/0018465 A1 | 1/2018 | Carey et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0365429 A1 | 12/2018 | Segal |
| 2019/0014141 A1 | 1/2019 | Segal et al. |
| 2019/0036961 A1 | 1/2019 | Gorodissky et al. |

FOREIGN PATENT DOCUMENTS

| | | |
|---|---|---|
| CN | 104009881 A | 8/2014 |
| WO | WO 00/038036 A2 | 6/2000 |
| WO | WO 2004/031953 A1 | 4/2004 |
| WO | WO 2008/054982 A2 | 5/2008 |
| WO | WO 2010/069587 A1 | 6/2010 |
| WO | WO 2013/087982 A1 | 6/2013 |
| WO | WO 2015/111039 A1 | 7/2015 |
| WO | WO 2016/164844 A1 | 10/2016 |
| WO | WO 2018/156394 A1 | 8/2018 |

(56) References Cited

FOREIGN PATENT DOCUMENTS

OTHER PUBLICATIONS

Marques et al., "Dissemination of Flow Specification Rules," RFC 5575, pp. 1-22 (Aug. 2009).
Lindem et al., "Extensions to OSPF for Advertising Optional Router Capabilities," RFC 4970, pp. 1-13 (Jul. 2007).
"Best Vulnerability Scanner Software," G2, https://www.g2.com/categories/vulnerability-scanner, pp. 1-2 (Download from the Internet Sep. 2019).
Harvey, "XM Cyber HaXM: BAS Product Overview and Insight," QuinStreet, Inc., pp. 1-6 (Dec. 13, 2018).
Notice of Allowance and Fee(s) Due for U.S. Appl. No. 14/984,359 (dated May 24, 2017).
Non-Final Office Action for U.S. Appl. No. 14/984,359 (dated Nov. 28, 2016).
Khosroshahy et al., "Botnets in 4G Cellular Networks: Platforms to Launch DDoS Attacks Against the Air Interface," 2013 International Conference on Selected Topics in Mobile and Wireless Networking, Montreal, Canada, DOI: 10.1109/MoWNet.2013.6613793, pp. 1-7 (Aug. 19-21, 2013).
Jajodia et al., "Topological Vulnerability Analysis: A Powerful New Approach For Network Attack Prevention, Detection, and Response," Algorithms, Architectures and Information Systems Security, pp. 1-20 (2008).

\* cited by examiner

METHODS, SYSTEMS, AND COMPUTER READABLE MEDIA FOR ADVERTISING NETWORK SECURITY CAPABILITIES

PRIORITY CLAIM

This application claims the benefit of Indian Provisional Patent Application No. 201741009059, filed Mar. 16, 2017; the disclosure of which is incorporated herein by reference in its entirety.

TECHNICAL FIELD

The subject matter described herein relates to network communications. More specifically, the subject matter relates to methods, systems, and computer readable media for advertising network security capabilities.

BACKGROUND

In some communications networks, a network security system (NSS), e.g., a unified threat management (UTM) device or platform, may be available for Internet service provider (ISP) level content traffic filtering. For example, a UTM platform in a first network may monitor traffic and determine that some of the traffic is malicious and, in response, the UTM platform may initiate mitigation actions that cause the malicious traffic to be discarded before reaching end users.

While an NSS may detect and mitigate problems associated with malicious traffic, issues exist regarding communications between NSSs and relevant entities, e.g., routers and network operations nodes. For example, a network operator or a related node may know, using predefined configuration information, the capabilities of a local NSS, but may be unaware of network security capabilities of neighboring networks or nodes therein. As such, one network may be unable to verify that some received traffic can be trusted. Further, if a first network is unable to trust traffic from one or more nodes or networks, all traffic from those nodes or networks may be analyzed for threats by a local NSS in the first network, which can result in expensive, limited resources being inefficiently utilized and potentially wasted. Since many communications involve multiple nodes and/or networks, network security issues can be significantly reduced or alleviated by improving communications between NSSs and relevant entities.

SUMMARY

Methods, systems, and computer readable media for advertising network security capabilities are disclosed. According to one method, the method occurs at a network node. The method includes receiving a first route advertisement message that includes network security capabilities information indicating capabilities of a network security system (NSS) associated with a route. The method also includes receiving traffic associated with a message flow. The method further includes directing, based on the network security capabilities information in the first route advertisement message, the traffic associated with the message flow to a downstream network node associated with the NSS.

According to one system for advertising network security capabilities, the system includes at least one processor. The system also includes a network node implemented using the at least one processor. The network node is configured for receiving a first route advertisement message that includes network security capabilities information indicating capabilities of an NSS associated with a route; receiving traffic associated with a message flow; and directing, based on the network security capabilities information in the first route advertisement message, the traffic associated with the message flow to a downstream network node associated with the NSS.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for advertising network security capabilities. Route advertisement protocols, such as a route advertisement protocol defined in Internet Engineering Task Force (IETF) request for comments (RFC) 5575, are usable by a downstream router to advertise the availability of a route. However, such route advertisement protocols do not provide mechanisms for granular communication of available inline threat detection and mitigation capabilities and/or related resources associated with an advertised route such that an upstream router could potentially direct different types of traffic (e.g., email, hypertext transfer protocol (HTTP), etc.) to routes based on particular threat protection for those types of traffic.

In accordance with some aspects of the subject matter described herein, equipment, techniques, methods, or mechanisms are disclosed for advertising network security capabilities information. For example, a computing platform or a module in accordance with one or more aspects described herein may extend a network route advertisement protocol, e.g., the protocol defined in IETF RFC 5575; the disclosure of which is incorporated herein by reference in its entirety. In this example, the extended protocol may provide a framework or mechanism to communicate capabilities of a downstream network security system (NSS), e.g., a unified threat management (UTM) system, in the routing plane to adjoining ISPs in an extensible manner. Continuing with this example, the extended protocol can indicate different threat detection and mitigation services (e.g., spam traffic filtering, malware traffic filtering, bot traffic filtering, etc.) for different traffic and/or flows (traffic/flows). Hence, in this example, by advertising network security capabilities associated with routes, routers in one operator's network may notify peers and/or routers in its network or a neighboring operator's network (e.g., an adjoining ISP) that certain network security capabilities (e.g., threat detection and mitigation services) are available to traffic/flows that traverse a particular route.

In accordance with some aspects of the subject matter described herein, equipment, techniques, methods, or mechanisms are disclosed for receiving traffic filtering information from a NSS and using it to block or discard malicious traffic at an upstream node. For example, a computing platform or a module in accordance with one or more aspects described herein may interact with a NSS via one or more communications interfaces. In this example, if a malicious pattern is detected in traffic analyzed by the NSS, the NSS may provide information about the malicious pattern to a router or other network node. Continuing with this example, the router or router or other network node may send traffic filter information, e.g., an access control list (ACL), via a route advertisement message to an upstream router. The traffic filter information in the route advertisement protocol message may inform the upstream router to block, discard, or otherwise mitigate traffic indicated by the traffic filter information.

In accordance with some aspects of the subject matter described herein, equipment, techniques, methods, or mechanisms are disclosed for using network security capabilities information and/or traffic filter information in traffic routing decisions. For example, a computing platform or a module in accordance with one or more aspects described herein may receive a route advertisement message containing network security capabilities information and/or traffic filter information. In this example, the computing platform or the module may use the information in the route advertisement message to select or determine an appropriate route for a message or related message flow. Continuing with this example, selecting or determining the appropriate route for the message or related message flow may involve analyzing the message or related traffic, determining that the message or related traffic matches the traffic filter information, and determining that an available network security capability of the NSS associated with the route is relevant to the message or related traffic, e.g., the traffic may include email messages and the network security capability associated with a selected routed may include email spam traffic filtering.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
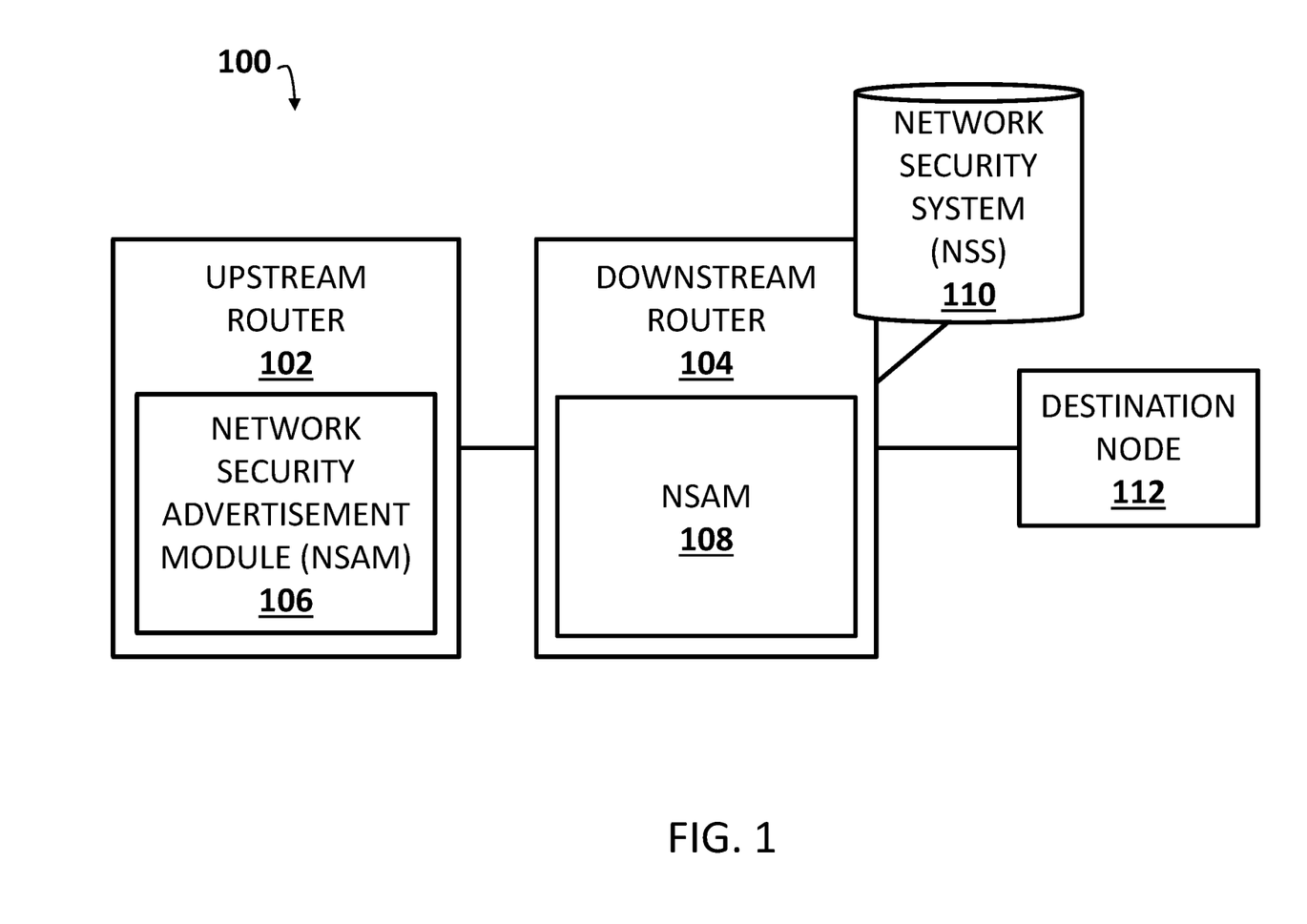
FIG. 1 is a diagram illustrating an example communications environment.

FIG. 1 is a diagram illustrating an example communications environment 100. In some embodiments, communications environment 100 may include one or more networks and/or network nodes. For example, communications environment 100 may represent two or more networks containing routers, servers, NSSs, and/or other entities, where some networks may be controlled by different network operators, e.g., Internet service providers (ISPs). For example, upstream router 102 may represent a network node controlled by one ISP and downstream router 104 and NSS 110 may represent network nodes controlled by another ISP. In another example, communications environment 100 may represent a network controlled by a single network operator or ISP. For example, upstream router 102, downstream router 104, and NSS 110 may represent network nodes controlled by the same ISP.

Referring to FIG. 1, communications environment 100 may include an upstream router 102, a downstream router 104, a NSS 110, and a destination node 112. Upstream router 102 may be any suitable entity (e.g., software executing on at least one processor) for routing, forwarding, relaying, or directing messages to one or more destinations, e.g., downstream router 104, NSS 110 and/or destination node 112. For example, upstream router 102 may include one or more communications interfaces for routing messages associated with one or more communications protocols, e.g., one or more network layer protocols (e.g., an Internet protocol (IP)); one or more transport layer protocols (e.g., a transmission control protocol (TCP), a user datagram protocol (UDP), a stream control transmission protocol (SCTP), and/or a reliable data protocol (RDP)); and/or one or more session layer protocols. In some embodiments, upstream router 102 may include or represent a network router and/or a network switch. As depicted in FIG. 1, upstream router 102 may be located upstream or before one or more network nodes (e.g., downstream router 104) relative to a direction of communications.

Upstream router 102 may include a network security advertisement module (NSAM) 106. NSAM 106 may be any suitable entity (e.g., software executing on at least one processor) for performing one or more aspects associated with advertising network security capabilities. In some embodiments, NSAM 106 may include functionality for sending, receiving, and processing route advertisement messages. For example, NSAM 106 may receive a route advertisement message (e.g., from downstream router 104) that includes network security capabilities information indicating capabilities of NSS 110 associated with a route. In this example, NSAM 106 may process the route advertisement message and use the network security capabilities information and/or other information (e.g., flow filters, route information, etc.) in the route advertisement message when determining or selecting a route. Example network security capabilities of NSS 110 may include traffic filtering, spam traffic filtering, virus traffic filtering, malware traffic filtering, ransomware traffic filtering, or bot traffic filtering. In another example, NSAM 106 may generate and/or send a route advertisement message to one or more entities.

Downstream router 104 may be any suitable entity (e.g., software executing on at least one processor) for routing, forwarding, relaying, or directing messages to one or more destinations, e.g., upstream router 102, NSS 110 and/or destination node 112. For example, downstream router 104 may include one or more communications interfaces for routing messages associated with one or more communications protocols, e.g., one or more network layer protocols; one or more transport layer protocols; and/or one or more session layer protocols. In some embodiments, downstream router 104 may include or represent a network router and/or a network switch. As depicted in FIG. 1, downstream router 104 may be located downstream or after one or more network nodes (e.g., upstream router 102) relative to a direction of communications.

Downstream router 104 may include a NSAM 108. NSAM 108 may be any suitable entity (e.g., software executing on at least one processor) for performing one or more aspects associated with advertising network security capabilities. In some embodiments, NSAM 108 may include functionality for sending, receiving, and processing route advertisement messages. For example, NSAM 108 may generate a route advertisement message (e.g., to upstream router 102) that includes network security capabilities information indicating capabilities of NSS 110 associated with a route. In this example, NSAM 106 may send the route advertisement message to various nodes, e.g., upstream router 102, and the various nodes may receive and use the information in the route advertisement message to route one or more flows. In another example, NSAM 108 may receive and process a route advertisement message (e.g., from another downstream router) that includes network security capabilities information indicating capabilities of NSS 110 associated with a route.

NSS 110 may be any suitable entity (e.g., software executing on at least one processor, one or more computing platforms, etc.) for performing one or more network security related actions. Example network security related actions may include performing a threat analysis involving analyzing one or more related messages (e.g., message payloads in a message flow) for determining whether the messages are associated with one or more network related threats, e.g., spam, viruses, malware, ransomware, and/or bots. In some embodiments, NSS 110 may include one or more communications interfaces, e.g., a data channel interface) for communicating with downstream router 104 and/or other nodes.

In some embodiments, NSS 110 may be a separate entity (e.g., network node) communicatively connected to downstream router 104. For example, downstream router 104 and NSS 110 may be implemented in separate computing platforms and connected via one or more communications interface, e.g., using Internet protocol (IP) and/or network interface cards (NICs).

In some embodiments, NSS 110 may be integrated and/or part of downstream router 104. For example, downstream router 104 and NSS 110 may be implemented in the same node or computing platform. In this example, downstream router 104 and NSS 110 may communicate using an internal switching fabric and/or other communication interfaces. In another example, downstream router 104 and NSS 110 may communicate using IP and/or NICs.

In some embodiments, NSS 110 may include functionality for analyzing messages from downstream router 104 for one or more threats and may provide, via one or more application programming interfaces (APIs), a network message, and/or other delivery mechanisms, feedback to one or more downstream nodes, e.g., router 104. For example, after detecting a malicious pattern in a message flow, NSS 110 may signal downstream router 104 (e.g., via a data channel interface) with information that allows downstream router 104 to instruct upstream router 102 to block associated malicious traffic. In this example, downstream router 104 may instruct upstream router 102 to block associated malicious traffic using an ACL that can be installed by upstream router 102.

In some embodiments, NSS 110 may include functionality for providing network security capabilities information to downstream router 104, e.g., via an API, a network message, and/or other delivery mechanisms. For example, NSS 110 may communicate with downstream router 104 via a data interface or another interface.

Destination node 112 may represent any suitable entity (e.g., software executing on at least one processor) for receiving traffic sent from or via routers 102-104. For example, destination node 112 may represent an intermediate node or next hop that a message traverses after leaving downstream router 104. In another example, destination node 112 may represent an intended destination for a routed message, e.g., an end user device or a core network node.

It will be appreciated that FIG. 1 is for illustrative purposes and that various nodes and/or modules, locations, and/or functionality described above in relation to FIG. 1 may be changed, altered, added, or removed.

Figure 2:
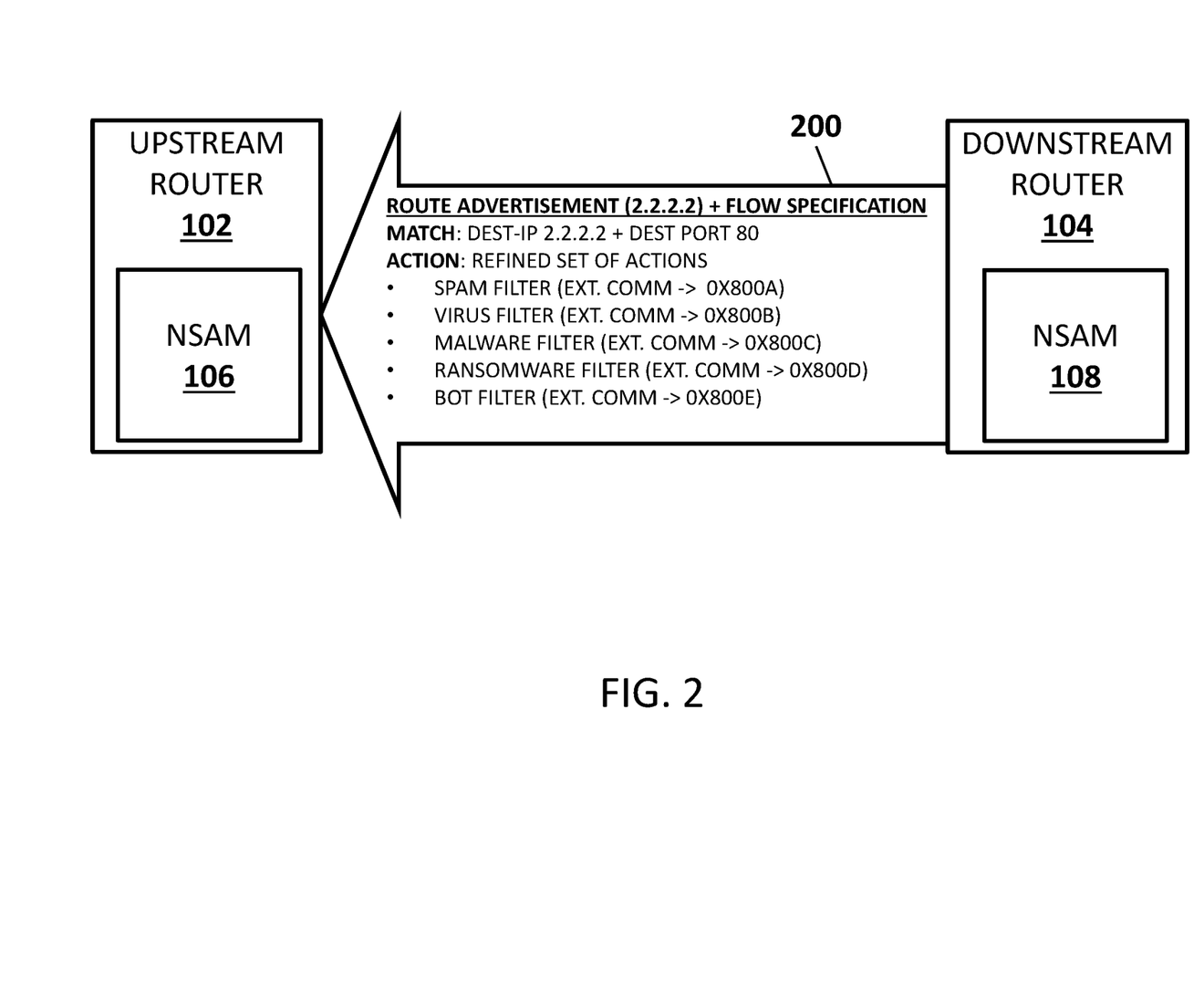
FIG. 2 is a diagram illustrating an example route advertisement message containing network security capabilities information associated with a network security system (NSS)

FIG. 2 is a diagram illustrating an example route advertisement message 200 containing network security capabilities information associated with NSS 110. In some embodiments, route advertisement message 200 may be generated and sent from downstream router 104 to upstream router 102. In this example, the network security capabilities information may be received or obtained from NSS 110, e.g., via a data channel interface or other communications interface between NSS 110 and downstream router 104.

In some embodiments, route advertisement message 200 may be generated using an extension of a route advertisement protocol defined in IETF RFC 5575. In some embodiments, an extension of IETF RFC 5575 may be leveraged as a mechanism for routers 102-104 or other network nodes to advertise and be aware of network security capabilities associated with a route in a vendor neutral and/or carrier neutral manner. For example, NSAM 108 may generate route advertisement message 200 similar to the protocol defined in IETF RFC 5575.

Referring to FIG. 2, route advertisement message 200 may include one or more extended flow specification rules for a route to destination '2.2.2.2'. In some embodiments, a flow specification rule may include flow filter information indicating that packets with a destination IP of '2.2.2.2' and destination port of '80' are to use the route advertised therein.

In some embodiments, route advertisement message 200 and/or a related flow specification rule may include relevant traffic filtering actions and extended community values (e.g., values that indicate network security capabilities for different potential network threat). In this example, by including distinct extended community values for threat-specific traffic filtering actions, route advertisement message 200 may efficiently and effectively provide information to various entities about potential routes and their related network security assessment capabilities. In other words, each combination of flow filter and related action may define a unique threat management situation that can be implemented by upstream router 102 and/or other relevant nodes in communications environment 100. Moreover, upstream router 102 or other node may use this information to direct certain traffic flows to different routes based on the type of traffic and/or threat assessment needed, e.g., NSS 110 may be able to detect and filter viruses from email traffic but not from web traffic.

In some embodiments, network security capabilities information may include values or indicators based on an agreed-upon or common set of values. For example, the base specification in RFC 5575 may be extended to include one or more additional community values, e.g., 0x800a, 0x800b, 0x800c, 0x800d, 0x800e, etc. In this example, 0x800a may represent a spam traffic filtering capability; 0x800b may represent a virus traffic filtering capability; 0x800c may represent a malware traffic filtering capability; 0x800d may represent a ransomware traffic filtering capability; and 0x800e may represent a bot traffic filtering capability. In this example, assuming these extended community values and/or related network security capabilities advertisement functionality are widely adopted and implemented in routers, network operators and/or related service providers may build networks that can consistently interpret such extended community values across network and autonomous system boundaries. Further, such usage would allow detailed advertisement of unique network security capabilities (e.g., threat management capabilities) between peers and nodes that are intra-domain or inter-domain (e.g., Internet domains or networks controlled by one service provider or different service providers).

It will be appreciated that FIG. 2 is for illustrative purposes and that different and/or additional information (e.g., extended community values) may be used for advertising network security capabilities and/or related actions. For example, various threats may arise for network operators may be added (e.g., via an RFC standard, an inter-network agreement, or some other technique) to the list of common or accepted community values between two or more ISPs.

Figure 3:
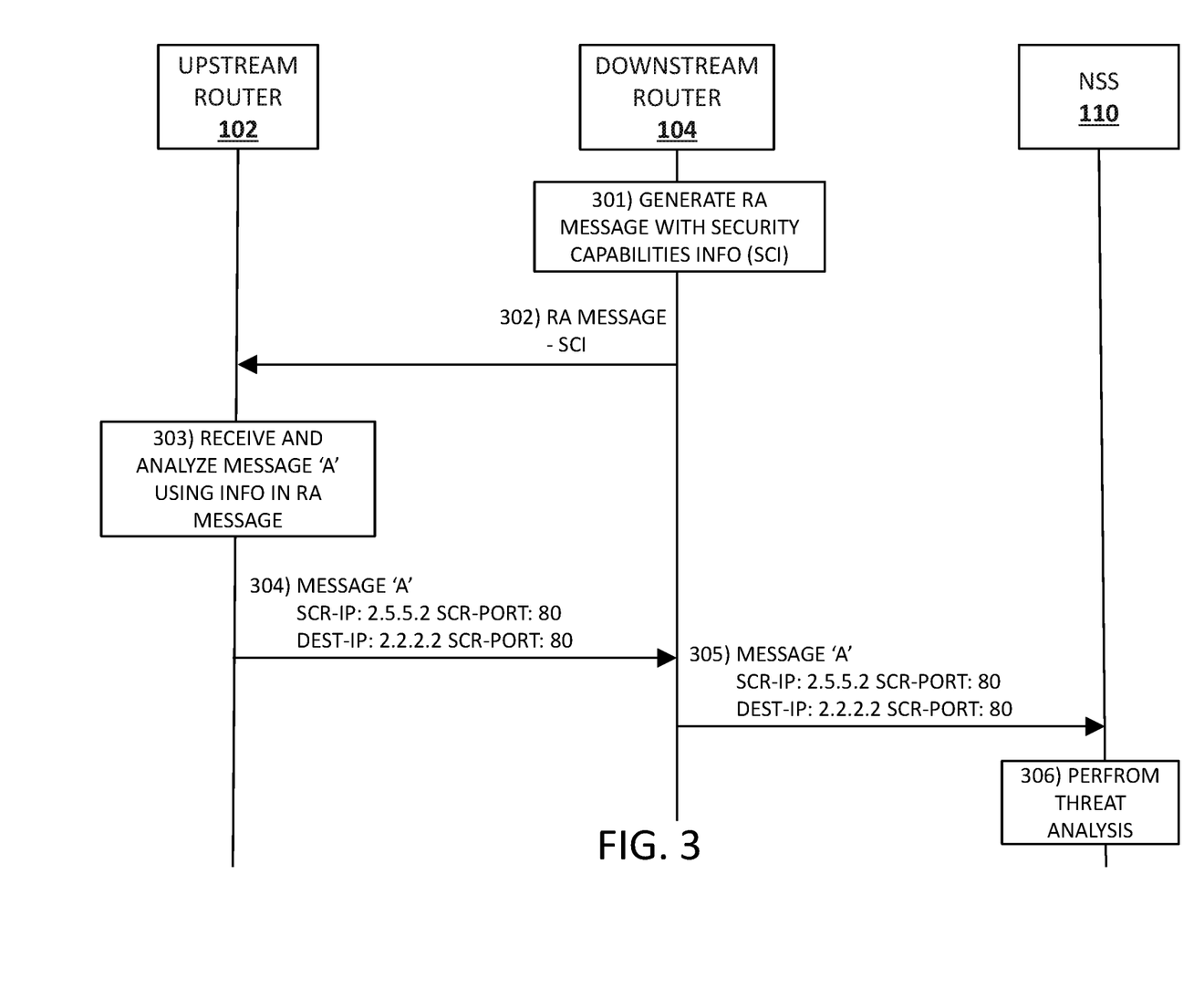
FIG. 3 is a diagram illustrating example communications for advertising network security capabilities information.

FIG. 3 is a diagram illustrating example communications for advertising network security capabilities information. In some embodiments, NSS 110 may provide network security capabilities information to downstream router 104 via a data channel interface or another interface and downstream router 104 may provide the network security capabilities information to one or more nodes, e.g., upstream router 102, via one or more route advertisement messages. In some embodiments, downstream router 104 may know or have access to network security capabilities information associated with NSS 110, e.g., via a network operator, message exchanges, and/or using predefined configuration information.

Referring to FIG. 3, in step 301, a route advertisement message containing network security capabilities information may be generated by downstream router 104.

In step 302, the route advertisement message containing the network security capabilities information may be sent from downstream router 104 to upstream router 102.

In some embodiments, the route advertisement message containing the network security capabilities information may be received and stored by upstream router 102. In such embodiments, upstream router 102 may use the network security capabilities information and/or information in the route advertisement message to determine or select an appropriate route for one or more message flows.

In step 303, a message 'A' (e.g., an IP and/or HTTP message) may be received and processed by upstream router 102 using information in the route advertisement message. For example, upstream router 102 may determine whether message 'A' matches a particular flow filter associated with a route advertised in a route advertisement message.

In step 304, message 'A' may be directed (e.g., forwarded or routed) from upstream router 102 to downstream router 104. For example, upstream router 102 may determine that a message matches a particular flow filter associated with a route being advertised in a route advertisement message and, as such, upstream router 102 may route the message and related messages via the advertised route In step 305, message 'A' may be sent from downstream router 104 to NSS 110 for analysis.

In step 306, after message 'A' is received by NSS 110, a threat analysis may be performed on message 'A'.

It will be appreciated that FIG. 3 is for illustrative purposes and that different and/or additional messages and/or actions may be used for advertising network security capabilities and/or related actions. It will also be appreciated that various messages and/or actions described herein with regard to FIG. 3 may occur in a different order or sequence.

Figure 4:
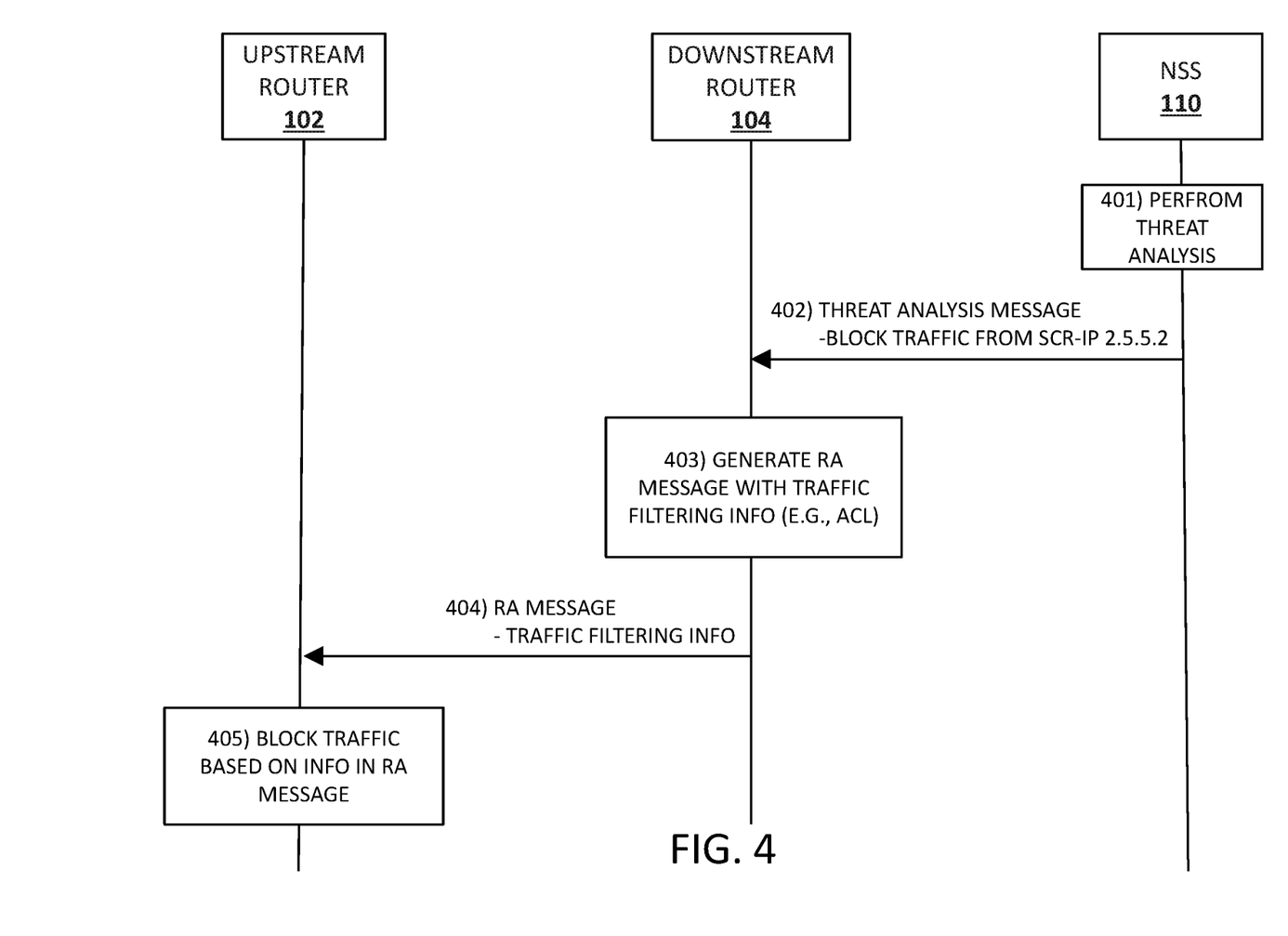
FIG. 4 is a diagram illustrating example communications for instructing a network node to block traffic.

FIG. 4 is a diagram illustrating example communications for instructing a network node to block traffic. In some embodiments, NSS 110 may provide threat analysis feedback and/or other information to downstream router 104 via a data channel interface or another interface and downstream router 104 may instruct upstream router 102 to block associated malicious traffic based on the information from NSS 110.

Referring to FIG. 4, in step 401, a threat analysis or a related action may be performed by NSS 110 on a message received from downstream router 104 or another node.

In step 402, a threat analysis message may be sent from NSS 110 to downstream router 104. For example, a threat analysis message may indicate that NSS 110 identified malicious (or seemingly malicious) traffic associated with a source IP address of '2.5.5.2'.

In step 403, a route advertisement message containing traffic filter information may be generated by downstream router 104 using information from NSS 110.

In step 404, the route advertisement message containing the traffic filter information may be sent from downstream router 104 to upstream router 102.

In step 405, the route advertisement message containing the traffic filter information may be received and processed by upstream router 102. In such embodiments, upstream router 102 may use information in the route advertisement message to block traffic. For example, upstream router 102 may receive and/or implement an ACL from a received advertisement message. In this example, the ACL may filter network traffic by controlling whether routed packets (or other data units) are forwarded or blocked, where criteria used to determine how to handle the packets (or other data units) may include a source address, a destination address, a port number, an application protocol, and/or other information It will be appreciated that FIG. 4 is for illustrative purposes and that different and/or additional messages and/or actions may be used for advertising network security capabilities and/or related actions. It will also be appreciated that various messages and/or actions described herein with regard to FIG. 4 may occur in a different order or sequence.

Figure 5:
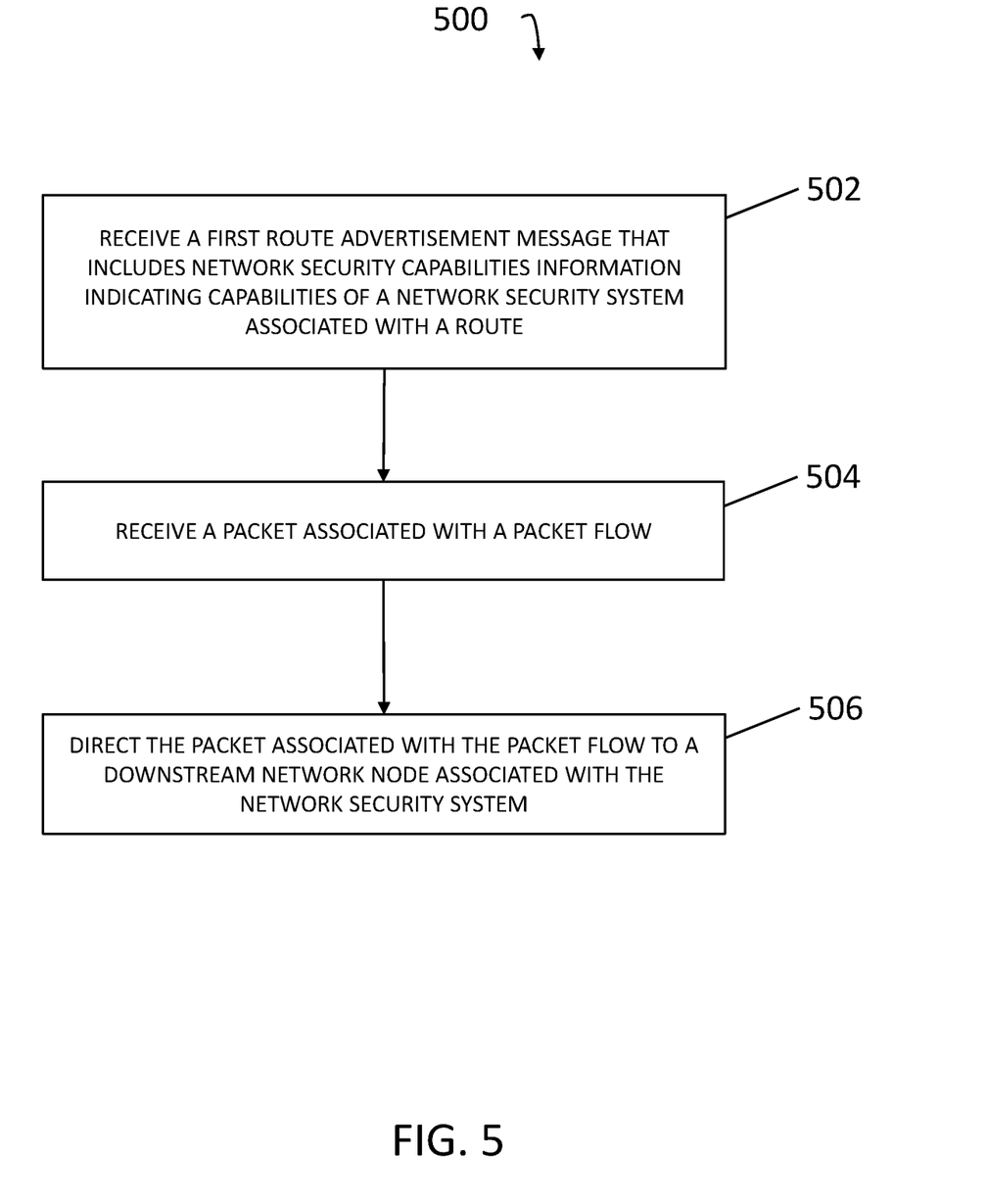
FIG. 5 is a diagram illustrating an example process for advertising network security capabilities.

FIG. 5 is a diagram illustrating an example process 500 for advertising network security capabilities. In some embodiments, process 500, or portions thereof, may be performed by NSAM 106, NSAM 108, upstream router 102, downstream router 104, and/or another node or module. In some embodiments, example process 500 may include steps 502, 504, and/or 506.

Referring to example process 500, in step 502, a first route advertisement message may be received. The first route advertisement message may include network security capabilities information indicating capabilities of a NSS associated with a route. For example, a route advertisement message may indicate that a particular route to destination node 112 provides email spam traffic filtering and HTTP bot traffic filtering. In this example, the traffic filtering actions may be services provided by NSS 110, where NSS 110 is configured to analyze message flows traversing downstream router 104.

In some embodiments, a first route advertisement message may include traffic filter information usable for determining whether a packet flow (e.g., related packets or messages) may use or not use a route indicated by the first route advertisement message. As used herein, the terms "packet" or "packets" may represent or refer to various data units, such as a packet, a frame, a datagram, a UDP message, a TCP message, or, more generally, a protocol data unit (PDU).

In some embodiments, network security capabilities information may indicate that an NSS may be capable of performing spam traffic filtering, virus traffic filtering, malware traffic filtering, ransomware traffic filtering, or bot traffic filtering. In some embodiments, a first route advertisement message may use a network route advertisement protocol extension for indicating network security capabilities information. In some embodiments, a first route advertisement message may be sent by a downstream network node.

In step 504, a packet associated with a packet flow may be received. For example, the packet may include an HTTP request message.

In step 506, the packet associated with the packet flow may be directed, based on the network security capabilities information in the first route advertisement message, to a downstream network node associated with the NSS. For example, assuming that a potential route 'R' includes HTTP bot traffic filtering and that upstream router 102 is aware of route 'R' via a route advertisement message (e.g., route advertisement message 200), upstream router 102 may direct HTTP traffic to downstream router 104 associated with route 'R' such that the packet and/or other related packets may be analyzed for botnet characteristics.

In some embodiments, directing a packet associated with a packet flow to a downstream network node associated with an NSS may include analyzing the packet, determining that the packet matches traffic filter information associated with the route, and determining that a network security capability of the NSS associated with the route is relevant to the packet.

In some embodiments, an NSS may be configured for receiving the packet associated with the packet flow and performing a threat analysis action involving the packet.

In some embodiments, a downstream network node (e.g., downstream router 104) may be configured for receiving a threat analysis message from the security network system; generating a second route advertisement message that includes information that instructs the network node to block or discard subsequent packets associated with the packet flow; and sending the second route advertisement message to the network node.

It will be appreciated that process 500 is for illustrative purposes and that different and/or additional actions may be used. It will also be appreciated that various actions described herein may occur in a different order or sequence.

It should be noted that NSAM 106, NSAM 108, upstream router 102, downstream router 104, NSS 110, and/or functionality described herein may constitute a special purpose computing device. For example, NSS 110 may be a ThreatARMOR™ security appliance manufactured by Ixia and configured to perform various aspects described herein. Further, NSAM 106, NSAM 108, upstream router 102, downstream router 104, NSS 110, and/or functionality described herein can improve the technological field of network security by providing a tenable solution for advertising network security capabilities, e.g., to upstream nodes and/or other networks. Further, NSAM 106, NSAM 108, upstream router 102, downstream router 104, NSS 110, and/or functionality described herein can improve the technological field of network routing by using network security capabilities information when selecting a relevant route for a packet flow, thereby security related resources can be efficiently utilized for particular message flows, e.g., high threat risk messages, messages associated with particular communications protocols, and/or messages from untrusted networks or nodes.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for advertising network security capabilities, the method comprising:
    at a network node, wherein the network node directs packets to downstream network nodes according to one or more of a plurality of routes, wherein at least one of the plurality of routes involves traversing a downstream network security system:
        receiving an extended request for comments (RFC) 5575 based first route advertisement message that includes network security capabilities information indicating threat assessment capabilities of the network security system along a route, wherein the first route advertisement message uses a network route advertisement protocol extension for indicating the network security capabilities information, wherein the network security capabilities information indicates that the network security system is capable of performing spam traffic filtering, virus traffic filtering, malware traffic filtering, ransomware traffic filtering, or bot traffic filtering;
        receiving a packet associated with a first packet flow;
        determining that the packet requires threat assessment;
        directing, based on the network security capabilities information in the first route advertisement message, the packet associated with the first packet flow to a downstream network node associated with the route such that the packet is processed by the network security system, and wherein the downstream network node is upstream from the network security system, wherein packets associated with a second packet flow are directed along a second path that bypasses the network security system; and
        receiving, from the downstream network node, a second route advertisement message, wherein the second route advertisement message includes information that instructs the network node to block or discard subsequent packets associated with the first packet flow, wherein the second route advertisement message is generated by the downstream network node after receiving a threat analysis message associated with the packet from the network security system.

2. The method of claim 1 wherein the first route advertisement message includes traffic filter information usable for determining whether the first packet flow is to use or not use the route.

3. The method of claim 1 wherein directing, based on the network security capabilities information in the first route advertisement message, the packet associated with the first packet flow to the downstream network node includes analyzing the packet, determining that the packet matches traffic filter information associated with the route, and determining that a network security capability of the network security system associated with the route is relevant to the packet.

4. The method of claim 1 wherein the first route advertisement message is sent by a downstream network node.

5. The method of claim 1 comprising:
at the network security system:
receiving the packet associated with the first packet flow; and
performing a threat analysis action involving the packet.

6. A system for advertising network security capabilities, the system comprising:
at least one processor; and
a network node implemented using the at least one processor, wherein the network node directs packets to downstream network nodes according to one or more of a plurality of routes, wherein at least one of the plurality of routes involves traversing a downstream network security system; the network node configured for:
receiving an extended request for comments (RFC) 5575 based first route advertisement message that includes network security capabilities information indicating threat assessment capabilities of the network security system along a route, wherein the first route advertisement message uses a network route advertisement protocol extension for indicating the network security capabilities information, wherein the network security capabilities information indicates that the network security system is capable of performing spam traffic filtering, virus traffic filtering, malware traffic filtering, ransomware traffic filtering, or bot traffic filtering;
receiving a packet associated with a first packet flow;
determining that the packet requires threat assessment;
directing, based on the network security capabilities information in the first route advertisement message, the packet associated with the first packet flow to a downstream network node associated with the route such that the packet is processed by the network security system, and wherein the downstream network node is upstream from the network security system, wherein packets associated with a second packet flow are directed along a second path that bypasses the network security system; and
receiving, from the downstream network node, a second route advertisement message, wherein the second route advertisement message includes information that instructs the network node to block or discard subsequent packets associated with the first packet flow, wherein the second route advertisement message is generated by the downstream network node after receiving a threat analysis message associated with the packet from the network security system.

7. The system of claim 6 wherein the first route advertisement message includes traffic filter information usable for determining whether the first packet flow is to use or not use the route.

8. The system of claim 6 wherein the network node is configured for directing, based on the network security capabilities information in the first route advertisement message, the packet associated with the first packet flow to the network security system by analyzing the packet, determining that the packet matches traffic filter information associated with the route, and determining that a network security capability of the network security system associated with the route is relevant to the packet.

9. The system of claim 6 wherein the first route advertisement message is sent by a downstream network node.

10. The system of claim 6 wherein the network security system is configured for:
receiving the packet associated with the first packet flow; and
performing a threat analysis action involving the packet.

11. A non-transitory computer readable medium comprising computer executable instructions that when executed by at least one processor of a computer cause the computer to perform steps comprising:
at a network node, wherein the network node directs packets to downstream network nodes according to one or more of a plurality of routes, wherein at least one of the plurality of routes involves traversing a downstream network security system:
receiving an extended request for comments (RFC) 5575 based first route advertisement message that includes network security capabilities information indicating threat assessment capabilities of the network security system along a route, wherein the first route advertisement message uses a network route advertisement protocol extension for indicating the network security capabilities information, wherein the network security capabilities information indicates that the network security system is capable of performing spam traffic filtering, virus traffic filtering, malware traffic filtering, ransomware traffic filtering, or bot traffic filtering;
receiving a packet associated with a first packet flow;
determining that the packet requires threat assessment;
directing, based on the network security capabilities information in the first route advertisement message, the packet associated with the first packet flow to a downstream network node associated with the route such that the packet is processed by the network security system, and wherein the downstream network node is upstream from the network security system, wherein packets associated with a second packet flow are directed along a second path that bypasses the network security system; and
receiving, from the downstream network node, a second route advertisement message, wherein the second route advertisement message includes information that instructs the network node to block or discard subsequent packets associated with the first packet flow, wherein the second route advertisement message is generated by the downstream network node after receiving a threat analysis message associated with the packet from the network security system.

12. The non-transitory computer readable medium of claim 11 wherein the first route advertisement message includes traffic filter information usable for determining whether the first packet flow is to use or not use the route.

13. The non-transitory computer readable medium of claim 11 wherein directing, based on the network security capabilities information in the first route advertisement message, the packet associated with the first packet flow to the network security system includes analyzing the packet, determining that the packet matches traffic filter information associated with the route, and determining that a network security capability of the network security system associated with the route is relevant to the packet.

\* \* \* \* \*